*US009607095B2*

United States Patent
Zhang

(10) Patent No.: US 9,607,095 B2
(45) Date of Patent: Mar. 28, 2017

(54) BROWSER COLLECTION METHOD, SYSTEM AND TERMINAL DEVICE, AND COMPUTER-READABLE STORAGE MEDIUM

(71) Applicant: TENCENT TECHNOLOGY (SHENZHEN) COMPANY LIMITED, Guangdong (CN)

(72) Inventor: Lei Zhang, Guangdong (CN)

(73) Assignee: TENCENT TECHNOLOGY (SHENZHEN) COMPANY LIMITED (CN)

( * ) Notice: Subject to any disclaimer, the term of this patent is extended or adjusted under 35 U.S.C. 154(b) by 312 days.

(21) Appl. No.: 14/329,349

(22) Filed: Jul. 11, 2014

(65) Prior Publication Data

US 2014/0324859 A1 Oct. 30, 2014

Related U.S. Application Data

(63) Continuation of application No. PCT/CN2013/089390, filed on Dec. 13, 2013.

(30) Foreign Application Priority Data

Mar. 28, 2013 (CN) .......................... 2013 1 0105630

(51) Int. Cl.
G06F 17/30 (2006.01)
(52) U.S. Cl.
CPC .............................. G06F 17/30884 (2013.01)
(58) Field of Classification Search
USPC ................ 707/608, 687, 705, 790, 813, 821
See application file for complete search history.

(56) References Cited

U.S. PATENT DOCUMENTS

2011/0083167 A1* 4/2011 Carpenter ......... G06F 17/30563
726/4

FOREIGN PATENT DOCUMENTS

| CN | 102298614 A | 12/2011 |
|---|---|---|
| CN | 102737121 A | 10/2012 |
| CN | 102830894 A | 12/2012 |

OTHER PUBLICATIONS

International Search Report and Written Opinion dated Mar. 20, 2014 in corresponding PCT Application No. PCT/CN2013/089390, 10 pages.

* cited by examiner

Primary Examiner — Sana Al Hashemi
(74) Attorney, Agent, or Firm — Hauptman Ham, LLP

(57) ABSTRACT

A browser collection method, a browser collection system and a terminal device including the browser collection system are provided. The method includes: receiving an address collection instruction signal inputted via a webpage tag or a button associated with the webpage tag; obtaining a webpage link address corresponding to the webpage tag in accordance with the address collection instruction signal; and saving the webpage link address in a favorites folder. Thus, a webpage link address can be saved in a favorites folder by inputting an address collection instruction via a webpage tag or a button associated with the webpage tag, without the need of opening the webpage, and such operations are quick, simple and convenient.

14 Claims, 5 Drawing Sheets

Bai⚑ Baidu <u>News</u>  Webpages <u>PostBar</u> <u>Knowledge</u>  Music  Picture  Video  Map  Library  More⟫

| C++ |

| ▸C++?Asking for solution!-- (Solved) www.vip-tarena.com/Tel:400-0066-506 |

Want to know c++? Ask for detailed explanations on c++?--<Tarena> answers for you

▨ 400-006-6506

Tarena C++ training  Offer Java lessons for free!www.sytarena.com

Tarena C++ training, high-salary job and famous enterprises guaranteed! Telephone for signing up the job training: 024-23988080!

▨ 024-23988080

| C++ Baidu encyclopedia |

The word C++ is usually pronounced as "C jia jia" in the circle of programmers in mainland China, whereas western programmers usually pronounce it as "C plus plus" or "CPP". It is a computer programming language widely used...
<u>Brief introduction</u> -<u>From C to C++</u> -<u>Development history</u> -<u>Language features</u> -<u>Programming skills</u> - <u>More</u>⟫ baike.baidu.com/view/118570.htm 2013-1-23

<u>cplusplus.com - The C++ Resources Network</u>

C++ Documentation Documentation pages and tutorials describing specifics about the different features of the C++ language. C++ Language Tutorial: ...

www.cplusplus.com/ 2013-1-24 - <u>Baidu Snapshot</u>

| From beginner to expert: Comprehensively learning C++ -- eNET web college |

This book does not follow the conventional mode, but gives explanations from a shortest C++ program firstly, explicates related knowledge From the actual programming of the complete program, and then expands the program in the following tutorial continuously and ....
www.enet.com.cn/eschool/video/c···2013-1-24-<u>Baidu Snapshot</u>

<u>Special topic: C++ is a useless language?! 51CTO.COM- Technology completes dream- Chine leading IT...</u>

FIG. 3

BROWSER COLLECTION METHOD, SYSTEM AND TERMINAL DEVICE, AND COMPUTER-READABLE STORAGE MEDIUM

This application is a continuation of International Application No. PCT/CN2013/089390 filed on Dec. 13, 2013, which claims priority to Chinese Patent Application No. 201310105630.0, with a title of "BROWSER COLLECTION METHOD, SYSTEM AND TERMINAL DEVICE", filed on Mar. 28, 2013 with the State Intellectual Property Office of China, the entire disclosures of which are herein incorporated by reference.

TECHNICAL FIELD

The present disclosure belongs to the field of computer technology, and particularly, relates to a browser collection method, a browser collection system and a terminal device including the browser collection system, and a computer readable storage medium.

BACKGROUND

Currently, a general browsing process of a browser is as follows: after a user clicks on a webpage tag, a webpage corresponding to the webpage tag is opened and browsed, and if the user needs to collect the webpage tag (in other words, the webpage or a link corresponding to the webpage), he has to click on a favorites folder (i.e. a folder which can be used to collect or store the webpage tag, the webpage or the link corresponding to the webpage in which the user is interested), then the corresponding webpage tag can be collected (i.e. added into the favorites folder). Therefore, according to the current browsing mode of the browser, if the link (in other words, webpage link address) is clicked on, the webpage will be opened directly, and only after that, the user can collect the webpage. When a search engine (e.g. Baidu, Google, etc.) is used to search for related information, links of interest can be collected only after the user clicks on webpage link addresses in sequence to open the webpages and review them. Therefore, the conventional browser collection mode needs cumbersome and time-consuming operations, and is inconvenient for reviewing contents of interest collectively. Especially, in a case where a large amount of information needs to be filtered, such browser collection mode will be quite time-consuming.

SUMMARY

The embodiments of the present disclosure provide a browser collection method, the method comprising: receiving an address collection instruction signal inputted via a webpage tag or a button associated with the webpage tag; obtaining a webpage link address corresponding to the webpage tag in accordance with the address collection instruction signal; and saving the webpage link address in a favorites folder.

The embodiments of the present disclosure further provide a browser collection system, the system comprising: a collection instruction receiving unit configured to receive an address collection instruction signal inputted via a webpage tag or a button associated with the webpage tag; an obtaining unit configured to obtain a webpage link address corresponding to the webpage tag in accordance with the address collection instruction signal; and a collecting unit configured to save the webpage link address in a favorites folder.

The embodiments of the present disclosure further provide a terminal device comprising the above browser collection system.

The embodiments of the present disclosure further provide a computer-readable storage medium having computer instructions stored thereon, the computer instructions, when executed by a computer, causing the computer to perform the above browser collection method.

In the embodiments of the present disclosure, an address collection instruction signal inputted via a webpage tag or a button associated with the webpage tag is received, a webpage link address corresponding to the webpage tag is obtained in accordance with the address collection instruction signal, and the webpage link address is saved in a favorites folder, therefore, the webpage link address can be saved quickly in the favorites folder by inputting the address collection instruction via the webpage tag, without the need of opening the webpage, and such operations are quick, simple and convenient.

BRIEF DESCRIPTION OF THE DRAWINGS

In order to illustrate technical solutions of the embodiments of the present disclosure more clearly, a brief introduction to drawings required for description of the embodiments will be given below; obviously, the drawings described below are only some embodiments of the present disclosure, and those of ordinary skill in the art may also obtain other drawings from these drawings without paying inventive efforts.

FIG. 3 is a schematic diagram of browser collection provided by Embodiment Two of the present disclosure;

DETAILED DESCRIPTION

In order to make the object, technical solutions and advantages of the present disclosure clearer, the present disclosure will be further described in detail hereinafter in conjunction with the accompanying drawings and the embodiments. It is to be appreciated that the particular embodiments described herein are merely to explain the present disclosure, not to limit the present disclosure.

In the embodiments of the present disclosure, a webpage link address corresponding to a webpage tag can be obtained in accordance with an instruction of clicking on the webpage tag by a user, and the webpage link address may be saved in a favorites folder, so as to achieve a fast combined collection of webpage link addresses in batches.

Hereinafter, implementations of the embodiments of the present disclosure will be described in detail in conjunction with particular embodiments.

Embodiment One

Figure 1:
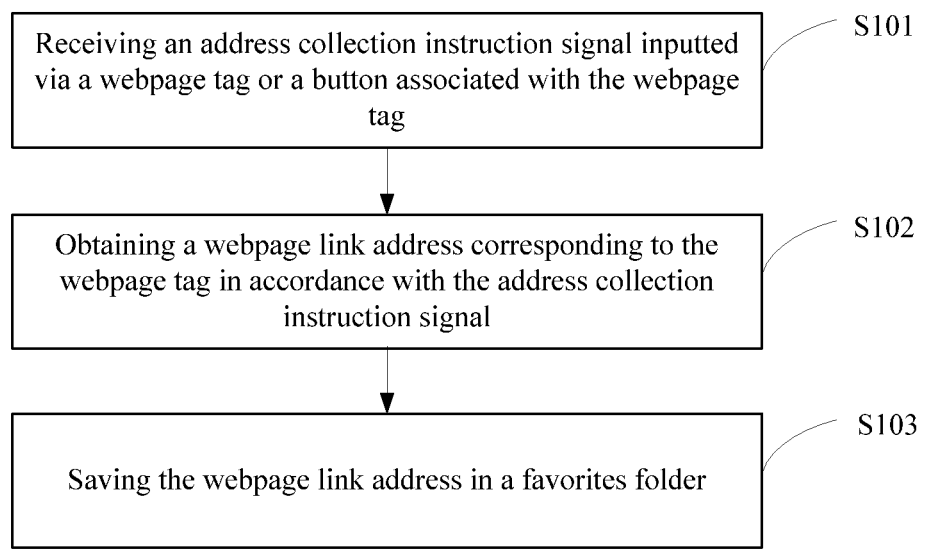
FIG. 1 is a flow chart of an implementation of a browser collection method provided by Embodiment One of the present disclosure.

FIG. 1 shows a flow chart of an implementation of a browser collection method provided by Embodiment One of the present disclosure, which is described in detail as follows.

In step S101, an address collection instruction signal inputted via a webpage tag or a button associated with the webpage tag is received.

In the embodiment, the webpage tag may be a hypertext markup language (html) tag, and preferably may be a link tag. Of course, the webpage tag can also be an image tag or a list tag associated with a webpage address (i.e. webpage link address), etc. The button associated with the webpage tag, for example, can be a button located around the webpage tag.

In the embodiment, the address collection instruction signal can be a signal of clicking on the webpage tag (e.g. a signal triggered by clicking on the webpage tag), a signal of double-clicking the webpage tag (e.g., a signal triggered by double-clicking on the webpage tag), other signal of operating the webpage tag (e.g., a signal triggered by operating the webpage tag in other way), or a signal of clicking on the button associated with the webpage tag (e.g., a signal triggered by clicking on the button). Therefore, the address collection instruction signal can be inputted by clicking on the webpage tag, double-clicking on the webpage tag, operating the webpage tag in other way, or clicking on the button associated with the webpage tag.

In the embodiment, the browser can receive the address collection instruction signal inputted to the webpage tag or the button associated with the webpage tag by the user manually or with a touch pen.

In step S102, a webpage link address corresponding to the webpage tag is obtained in accordance with the address collection instruction signal.

In the embodiment, while the webpage link address corresponding to the webpage tag is obtained, a tag name corresponding to the webpage tag can also be obtained.

In step S103, the webpage link address is saved in a favorites folder.

In the embodiment, the webpage link address corresponding to the webpage tag can be stored in the favorites folder together with the tag name corresponding to the webpage tag.

In the embodiment, the address collection instruction signal inputted via the webpage tag or the button associated with the webpage tag is received, the webpage link address corresponding to the webpage tag is obtained in accordance with the address collection instruction signal, and the webpage link address is saved in the favorites folder, therefore, the webpage link address can be saved in the favorites folder by inputting the address collection instruction signal via the webpage tag, without the need of opening the webpage, and such operations are quick, simple and convenient.

Embodiment Two

Figure 2:
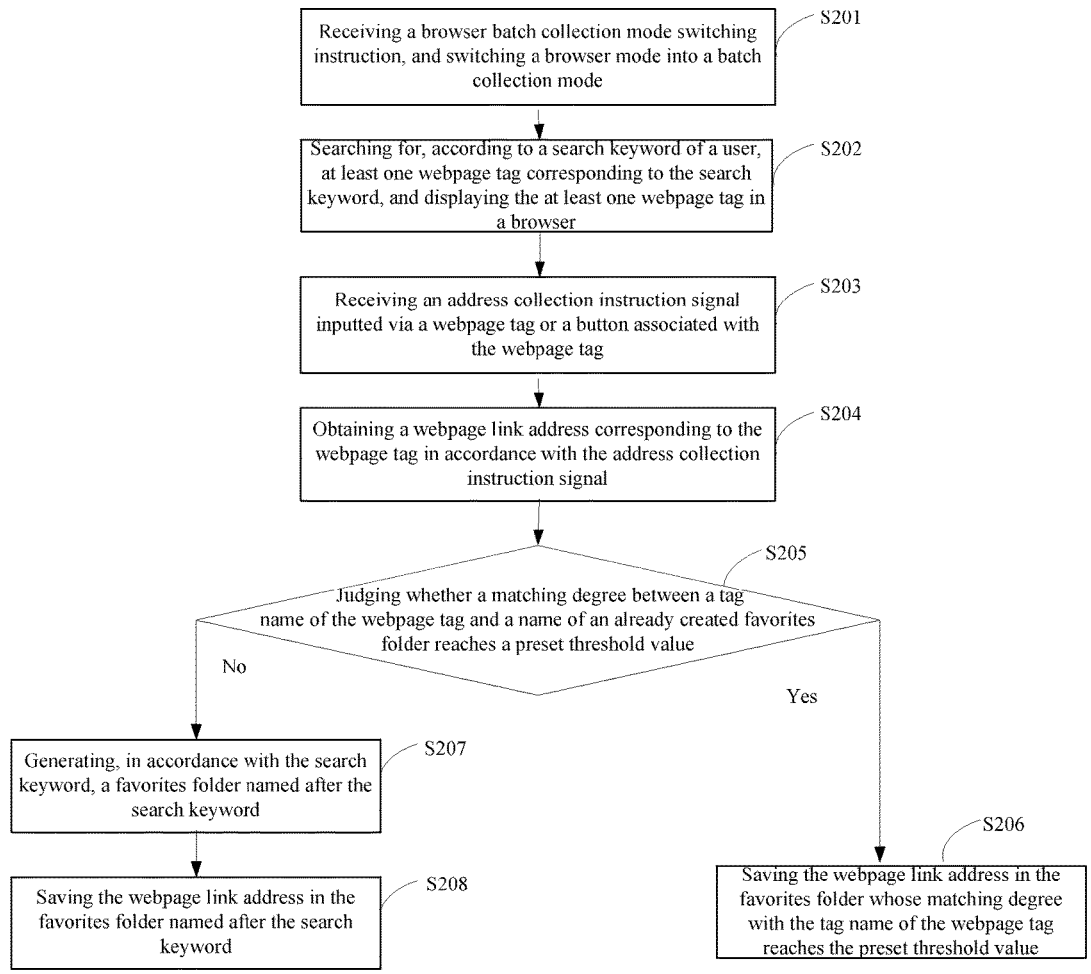
FIG. 2 is a flow chart of an implementation of a browser collection method provided by Embodiment Two of the present disclosure.

FIG. 2 shows a flow chart of an implementation of a browser collection method provided by Embodiment Two of the present disclosure. Herein, a description of details of Embodiment Two which are the same as those of Embodiment One will be omitted.

In step S201, a browser batch collection mode switching instruction is received, and a browser mode is switched to a batch collection mode.

In the embodiment, the browser can be configured with different modes which may include a batch collection mode and a browsing mode. When a browser batch collection mode switching instruction is received, the browser can enter the batch collection mode, i.e., can collect webpage links in batch according to the user's instruction, and when a browser browsing mode switching instruction is received, the browser can enter the browsing mode, i.e., can operate in a normal browsing mode of the browser.

In step S202, at least one webpage tag corresponding to a search keyword of a user is searched for according to the search keyword, and the at least one webpage tag is displayed in the browser.

In the embodiment, a plurality of webpage tags can be searched for and obtained according to the search keyword of the user, and the user can select a webpage tag of interest from the plurality of webpage tags to collect it, that is, step S203 can be executed.

In step S203, an address collection instruction signal inputted via the webpage tag or a button associated with the webpage tag is received.

In the embodiment, the user browses the plurality of webpage tags, and when he browses the webpage tag which he wants to collect, he can input a collection instruction signal via the webpage tag or the button associated with the webpage tag. The webpage tag, the button associated with the webpage tag, and the address collection instruction signal are the same as those described in Embodiment One, and descriptions thereof are omitted.

In step S204, a webpage link address corresponding to the webpage tag is obtained in accordance with the address collection instruction signal.

In the embodiment, when the address collection instruction signal is, for example, the signal of clicking on the webpage tag, the browser may obtain the webpage link address corresponding to the webpage tag automatically, instead of opening the webpage.

In step S205, it is judged whether a matching degree between a tag name of the webpage tag and a name of an already created favorites folder reaches a preset threshold value. If yes, i.e., when it is judged that the matching degree between the tag name of the webpage tag and the name of the already created favorites folder reaches the preset threshold value, step S206 is executed, whereas if no, step S207 is executed.

In the embodiment, the matching degree may refer to a similarity between the tag name of the webpage tag and the name of the already created favorites folder. When the matching degree between them reaches the preset threshold value, this shows that the similarity between them is high. On the contrary, when the matching degree between them does not reach the preset threshold value, the similarity between them is low. The preset threshold value can be set by the user according to needs.

In the embodiment, when it is judged that the matching degree between the tag name of the webpage tag and the name of the already created favorites folder reaches the preset threshold value, this shows that a favorites folder having a same subject matter as the webpage tag may have been created, thus the webpage link address corresponding to the webpage tag can be stored in the favorites folder directly, i.e., step S206 is executed. On the contrary, if it is judged that the matching degree between the tag name of the webpage tag and the name of the already created favorites folder does not reach the preset threshold value, step S207 is executed.

In step S206, the webpage link address is saved in the favorites folder whose matching degree with the tag name of the webpage tag reaches the preset threshold value.

In step S207, a favorites folder named after the search keyword is generated in accordance with the search keyword.

In the embodiment, naming the favorites folder after the search keyword may facilitate the user's browsing of the collected contents, and realizing categorization of the collected contents by names of favorites folders, so as to achieve a good categorization of the collected information.

In step S208, the webpage link address is saved in the favorites folder named after the search keyword.

In the embodiment, a "batch collection mode" option can be added to the browser, and a batch collection mode will be started after the option is selected. After the mode is started, webpage link addresses can be collected quickly in batch. At this time, when information is searched for by using a search engine (e.g., Baidu or Google), a click on a webpage tag displayed in the browser by the user is not to open the webpage any more, but to collect the webpage link address. Referring to FIG. 3, for example, a search keyword, C++, is input in a browser search box to search for learning materials related to C++, and search results shown in FIG. 3 can be obtained. Assume that the user is interested in contents of webpage tags in blocks. When the user clicks on a first webpage tag (at this time, the address collection instruction signal is the signal of clicking on the webpage tag), the system obtains a webpage link address corresponding to the webpage tag, and judges whether there is a favorites folder named after C++ in current browser folders. If there is, the system may store the webpage link address in the favorites folder directly, whereas if there is not, the system can create automatically a favorites folder named after [C++] in My Favorites, and the webpage link address will be collected in the folder (i.e., the favorites folder) created automatically, and all links (i.e., webpage link addresses) clicked on subsequently will be saved automatically in the folder. After the filtering of the search results is completed, the user may enter the "C++" favorites folder and then can browse the collected information therein collectively, and the collected information in respective favorites folders can be moved from one folder to another folder. When the "batch collection mode" is closed, the browser returns to a normal browsing mode, and the user can browse the webpage normally.

In the embodiment, in the process of executing the above steps S201 to S208, if a browser browsing mode switching instruction is received, the browser mode can be switched to the browsing mode, so that when receiving an instruction of clicking on a webpage tag, the browser opens a webpage corresponding to the webpage tag in accordance with the instruction.

In the embodiment, the address collection instruction signal inputted via the webpage tag or the button associated with the webpage tag is received, the webpage link address corresponding to the webpage tag is obtained in accordance with the address collection instruction signal, and the webpage link address is saved in the favorites folder, therefore, the webpage link address can be saved in the favorites folder by inputting the collection instruction via the webpage tag without the need of opening the webpage, and such operations are simple and convenient. In this way, when the user looks up materials or searches for information of interest, he can quickly collect and save information in batch, and in turn review the collected information collectively, so that an unnecessary waste of traffic is avoided, and the user may perform information search by using the browser more quickly and more conveniently. In addition, because the favorites folder can be created automatically according to the content of the webpage tag, information can be categorized while collecting the information quickly, thereby facilitating subsequent collective reviewing and reading.

Embodiment Three

Figure 4:
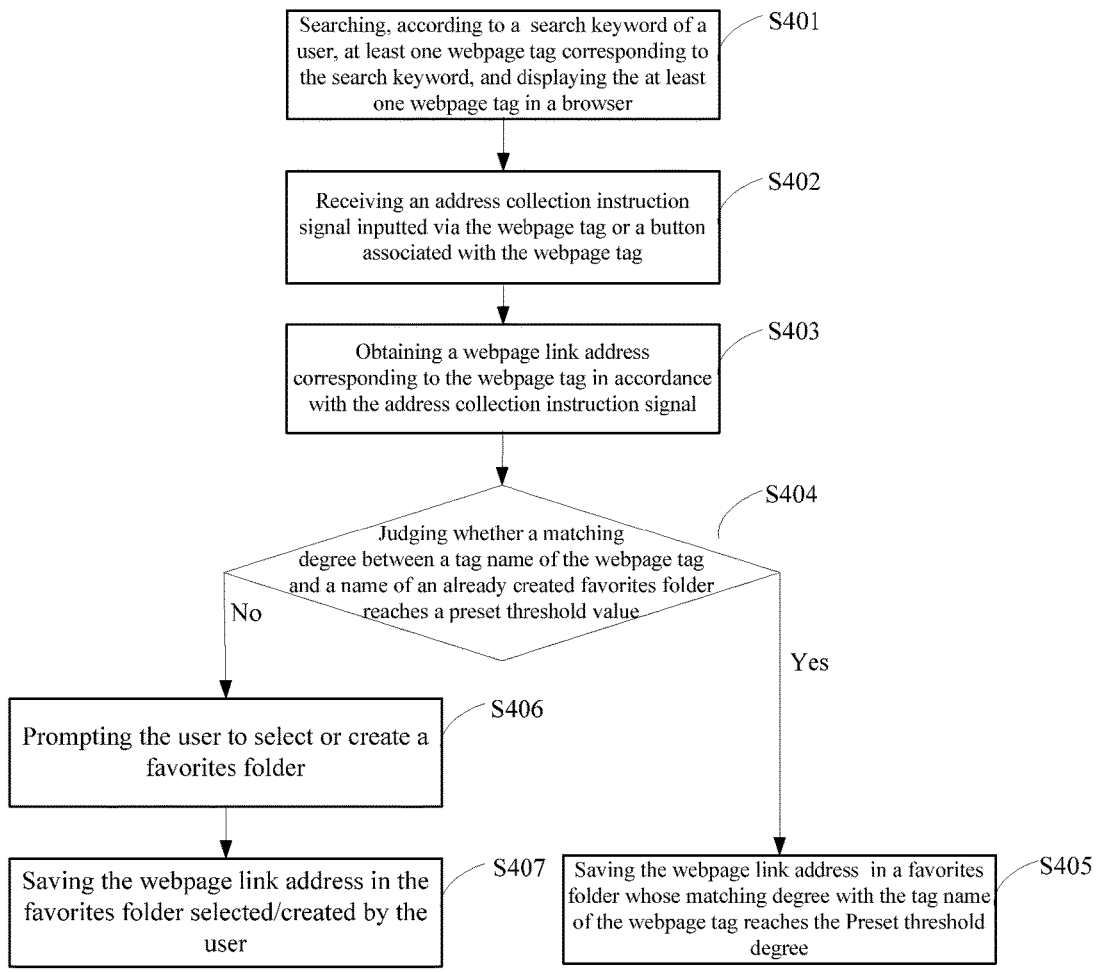
FIG. 4 is a flow chart of an implementation of a browser collection method provided by Embodiment Three of the present disclosure.

FIG. 4 shows a flow chart of an implementation of a browser collection method provided by Embodiment Three of the present disclosure. Herein, descriptions of details of Embodiment Three which are the same as those of Embodiment One and Embodiment Two are omitted.

In step S401, at least one webpage tag corresponding to a search keyword of a user is searched for according to the search keyword, and the at least one webpage tag is displayed in the browser.

In step S402, an address collection instruction signal inputted via the webpage tag or a button associated with the webpage tag is received. The webpage tag, the button associated with the webpage tag, and the address collection instruction signal are the same as those described with respect to Embodiment One, and descriptions thereof will be omitted here.

In step S403, a webpage link address corresponding to the webpage tag is obtained in accordance with the address collection instruction signal.

In step S404, it is judged whether a matching degree between a tag name of the webpage tag and a name of an already created favorites folder reaches a preset threshold value. If yes, i.e., when it is judged that the matching degree between the tag name of the webpage tag and the name of the already created favorites folder reaches the preset threshold value, step S405 is executed, whereas if no, step S406 is executed.

In step S405, the webpage link address is saved in the favorites folder whose matching degree with the tag name of the webpage tag reaches the preset threshold value.

In step S406, the user is prompted to select or create a favorites folder.

In step S407, the webpage link address is saved in the favorites folder selected or created by the user.

Optionally, when it is judged that the matching degree between the tag name of the webpage tag and the name of the already created favorites folder does not reach the preset threshold value, this shows that a favorites folder having the same subject matter as the webpage tag is not created locally. Thus, the user can be prompted to select a favorites folder, and at this time, the webpage link address corresponding to the webpage tag is saved in the favorites folder selected by the user, or the user can be prompted to create a favorites folder, and at this time, the webpage link address corresponding to the webpage tag is saved in the favorites folder created by the user.

For the purpose of convenience of understanding, a description is made by using the example illustrated in FIG. 3 again. In the implementation example, after obtaining the webpage link address corresponding to the webpage tag, the system can prompt the user to select a favorites folder, for example, the user may select a favorites folder "C++" which the user has created in advance. At this time, the webpage link address can be stored in the favorites folder "C++", and all links (i.e., webpage link addresses) clicked on subsequently will be saved automatically in the folder (i.e., the favorites folder).

In the embodiment, by prompting the user to select or create the folder in which the web link addresses are collected on his own, the user can categorize the collected information according to his own needs.

Embodiment Four

Figure 5:
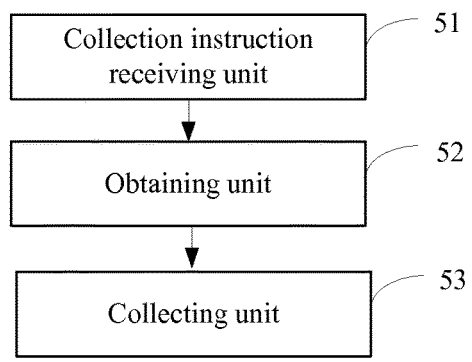
FIG. 5 is a structural diagram of a browser collection system provided by Embodiment Four of the present disclosure.

FIG. 5 shows a structural diagram of a browser collection system provided by Embodiment Four of the present disclosure. For convenience of explanation, only those parts related to the embodiment of the present disclosure are shown in the figure. The system can be a software unit, a hardware unit or a unit formed by a combination of software and hardware, which is built in a terminal device. Herein, descriptions of details of Embodiment Four which are the same as those of Embodiment One are omitted.

The system comprises a collection instruction receiving unit 51, an obtaining unit 52 and a collecting unit 53. The collection instruction receiving unit 51 can receive an address collection instruction signal inputted via a webpage tag or a button associated with the webpage tag.

The obtaining unit 52 can obtain a webpage link address corresponding to the webpage tag in accordance with the address collection instruction signal.

The collecting unit 53 can save the webpage link address in a favorites folder.

The browser collection system provided in the embodiment of the present disclosure can be used in the corresponding method Embodiment One described above. Please refer to the above descriptions of Embodiment One for details, and a detailed description of Embodiment Four is omitted here.

Embodiment Five

Figure 6:
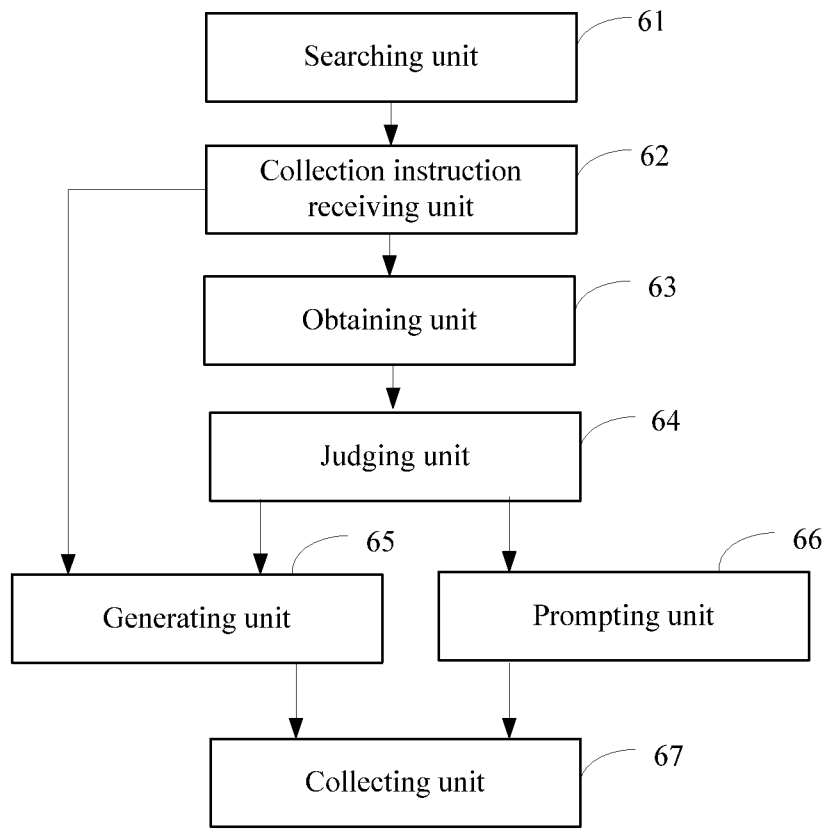
FIG. 6 is a structural diagram of a browser collection system provided by Embodiment Five of the present disclosure.

FIG. 6 shows a structural diagram of a browser collection system provided by Embodiment Five of the present disclosure. For convenience of explanation, only those parts related to the embodiment of the present disclosure are shown in the figure. The system can be a software unit, a hardware unit or a unit formed by a combination of software and hardware, which is built in a terminal device. Herein, descriptions of details of Embodiment Five which are the same as those of Embodiments One to Four are omitted.

The system can comprise a searching unit 61, a collection instruction receiving unit 62, an obtaining unit 63, a judging unit 64, a generating unit 65, a prompting unit 66 and a collecting unit 67.

Like Embodiment Four, the collection instruction receiving unit 62 can receive an address collection instruction signal inputted via a webpage tag or a button associated with the webpage tag, the obtaining unit 63 can obtain a webpage link address corresponding to the webpage tag in accordance with the address collection instruction signal, and the collecting unit 67 can save the webpage link address in the favorites folder.

The differences between this embodiment and Embodiment Four are as follows.

Optionally, the searching unit 61 can search for, according to a search keyword of a user, at least one webpage tag corresponding to the search keyword, and display the at least one webpage tag in the browser. The generating unit 65 can generate, in accordance with the search keyword, a favorites folder named after the search keyword. At this time, the collecting unit 67 can save the webpage link address corresponding to the webpage tag in the favorites folder named after the search keyword.

Optionally, the prompting unit 66 can prompt the user to select or create a favorites folder. At this time, the collecting unit 67 can save the webpage link address in the favorites folder selected or created by the user.

Optionally, the judging unit 64 can judge whether a matching degree between a tag name of the webpage tag and a name of an already created favorites folder reaches a preset threshold value. When judging that the matching degree between the tag name of the webpage tag and the name of the already created favorites folder reaches the preset threshold value, the judging unit 64 can trigger the collecting unit 67 to save the webpage link address in the already created favorites folder, and when judging that the matching degree between the tag name of the webpage tag and the name of the already created favorites folder does not reach the preset threshold value, the judging unit 64 can trigger the generating unit 65 to generate, in accordance with the search keyword, a favorites folder named after the search keyword and can trigger the collecting unit 67 to save the webpage link address in the favorites folder named after the search keyword, or can trigger the prompting unit 66 to prompt the user to select or create a favorites folder and can trigger the collecting unit 67 to save the webpage link address in the favorites folder selected or created by the user.

Optionally, the system further comprises a mode switching unit (not shown in the figure) configured to receive a browser batch collection mode switching instruction and switch a browser mode into a batch collection mode.

The switching unit is further configured to receive a browser browsing mode switching instruction to switch the browser mode into a browsing mode, so that when receiving an instruction of clicking on a webpage tag, the browser opens a webpage corresponding to the webpage tag in accordance with the instruction.

The browser collection system provided in the embodiment of the present disclosure can be used in the corresponding method Embodiments Two and Three described above. Please refer to the above descriptions of Embodiments Two and Three for details, and a detailed description of Embodiment Five is omitted here.

It is to be noted that the respective units included in the above embodiments are only divided according to functional logics, and the embodiments is not limited to such division, as long as the corresponding functions can be realized. In addition, the names of the respective units are given for the convenience of distinguishing them from each other, and are not to limit the protection scope of the present disclosure.

The sequence numbers of the above embodiments of present disclosure are only for the purpose of description, and do not represent preference among the embodiments.

Figure 7:
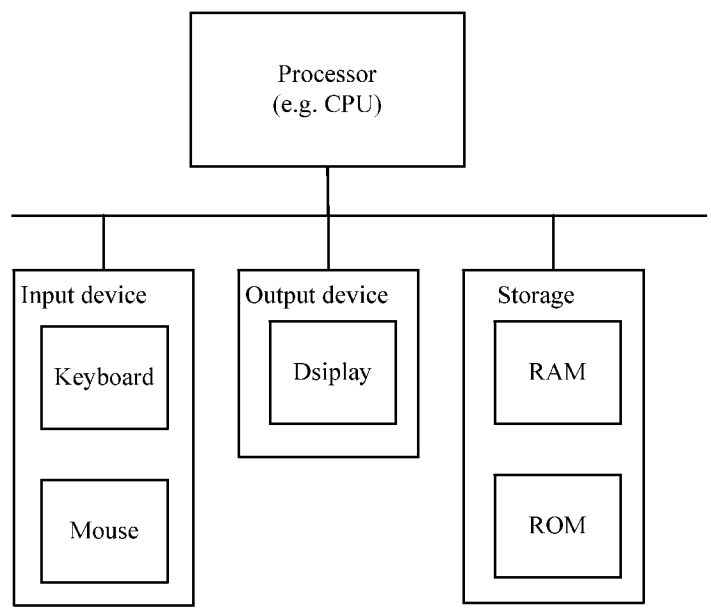
FIG. 7 shows a structural diagram of a general purpose computing device.

Furthermore, those of ordinary skill in the art can understand that all or a part of the steps in the methods for implementing the above embodiments can be completed by instructing related hardware by a program, the hardware may, for example, be a general purpose computing device, such as a computer, which includes a processor element(s), such as a central processing unit (CPU), an input device(s), such as a keyboard and a mouse, an output device(s), such as a display, a storage element(s), such as a random access memory (RAM), a read-only memory (ROM), and the like, as exemplarily shown in FIG. 7, and the corresponding program can be stored in a computer-readable storage medium, such as a ROM/RAM, a magnetic disk, a CD-ROM or the like. For example, computer instructions may be stored on the computer-readable storage medium, and the computer instructions, when executed by a computer, causes the computer to receive an address collection instruction signal inputted via a webpage tag or a button associated with the webpage tag, obtain a webpage link address corresponding to the webpage tag in accordance with the address collection instruction signal, and save the webpage link address in a favorites folder. Alternatively, when executed by a computer, the computer instructions can cause the computer to execute the method according to Embodiment Two or Embodiment Three. Additionally, the systems according to the above embodiments may also be implanted by the general purpose computing device.

The above embodiments are only preferred embodiments of the present disclosure, and are not intended to limit the disclosure. Any modifications, equivalent replacements, improvement and the like are included in the protection scope of the disclosure without departing from the spirit and principle of the disclosure.

What is claimed is:

1. A browser collection method, comprising:
   receiving an address collection instruction signal inputted via a webpage tag or a button associated with the webpage tag;
   obtaining a webpage link address corresponding to the webpage tag in accordance with the address collection instruction signal; and
   saving the webpage link address in a favorites folder, wherein
      before the receiving an address collection instruction signal inputted via a webpage tag or a button associated with the webpage tag, the method further comprises searching, according to a search keyword of a user, at least one webpage tag corresponding to the search keyword, and
      saving the webpage link address in a favorites folder includes:
         judging whether a matching degree between a tag name of the webpage tag and a name of an already created favorites folder reaches a preset threshold value;
         saving the webpage link address in the already created favorites folder, when the matching degree between the tag name of the webpage tag and the name of the already created favorites folder reaches the preset threshold value; and
         generating, in accordance with the search keyword, a favorites folder named after the search keyword, and saving the webpage link address in the favorites folder named after the search keyword, when the matching degree between the tag name of the webpage tag and the name of the already created favorites folder does not reach the preset threshold value.

2. A browser collection system, comprising:
   a collection instruction receiving unit configured to receive an address collection instruction signal inputted via a webpage tag or a button associated with the webpage tag;
   an obtaining unit configured to obtain a webpage link address corresponding to the webpage tag in accordance with the address collection instruction signal;
   a collecting unit configured to save the webpage link address in a favorites folder;
   a searching unit configured to search, according to a search keyword of a user, at least one webpage tag corresponding to the search keyword;
   a judging unit configured to judge whether a matching degree between a tag name of the webpage tag and a name of an already created favorites folder reaches a preset threshold value, and trigger the collecting unit to save the webpage link address in the already created favorites folder when the matching degree between the tag name of the webpage tag and the name of the already created favorites folder reaches the preset threshold value; and
   a generating unit configured to generate, in accordance with the search keyword, a favorites folder named after the search keyword when the matching degree between the tag name of the webpage tag and the name of the already created favorites folder does not reach the preset threshold value, so that the collecting unit saves the webpage link address in the favorites folder named after the search keyword.

3. A terminal device comprising a browser collection system, the browser collection system including:
   a collection instruction receiving unit configured to receive an address collection instruction signal inputted via a webpage tag or a button associated with the webpage tag;
   an obtaining unit configured to obtain a webpage link address corresponding to the webpage tag in accordance with the address collection instruction signal;
   a collecting unit configured to save the webpage link address in a favorites folder;
   a searching unit configured to search, according to a search keyword of a user, at least one webpage tag corresponding to the search keyword;
   a judging unit configured to judge whether a matching degree between a tag name of the webpage tag and a name of an already created favorites folder reaches a preset threshold value, and trigger the collecting unit to save the webpage link address in the already created favorites folder when the matching degree between the tag name of the webpage tag and the name of the already created favorites folder reaches the preset threshold value; and
   a generating unit configured to generate, in accordance with the search keyword, a favorites folder named after the search keyword when the matching degree between the tag name of the webpage tag and the name of the already created favorites folder does not reach the preset threshold value, so that the collecting unit saves the webpage link address in the favorites folder named after the search keyword.

4. A non-transitory computer-readable storage medium having computer instructions stored thereon, the computer instructions, when executed by a computer, causing the computer to:
   receive an address collection instruction signal inputted via a webpage tag or a button associated with the webpage tag;
   obtain a webpage link address corresponding to the webpage tag in accordance with the address collection instruction signal; and
   save the webpage link address in a favorites folder;
   wherein
      before the receiving an address collection instruction signal inputted via a webpage tag or a button associated with the webpage tag, when executed by a computer, causing the computer to search, according to a search keyword of a user, at least one webpage tag corresponding to the search keyword, and the saving the webpage link address in a favorites folder includes:
  judging whether a matching degree between a tag name of the webpage tag and a name of an already created favorites folder reaches a preset threshold value;
  saving the webpage link address in the already created favorites folder, when the matching degree between the tag name of the webpage tag and the name of the already created favorites folder reaches the preset threshold value; and
  generating, in accordance with the search keyword, a favorites folder named after the search keyword, and saving the webpage link address in the favorites folder named after the search keyword, when the matching degree between the tag name of the webpage tag and the name of the already created favorites folder does not reach the preset threshold value.

5. The method of claim 1, wherein before the receiving an address collection instruction signal inputted via a webpage tag or a button associated with the webpage tag, the method further comprises:
  displaying the at least one webpage tag in a browser.

6. The method of claim 1, wherein the saving the webpage link address in a favorites folder further includes:
  prompting a user to select or create a favorites folder; and
  saving the webpage link address in the favorites folder selected or created by the user.

7. The method of claim 1, wherein the saving the webpage link address in a favorites folder further includes:
  prompting a user to select or create a favorites folder and saving the webpage link address in the favorites folder selected or created by the user, when the matching degree between the tag name of the webpage tag and the name of the already created favorites folder does not reach the preset threshold value.

8. The method of claim 1, wherein before the receiving an address collection instruction signal inputted via a webpage tag or a button associated with the webpage tag, the method further comprises:
  receiving a browser batch collection mode switching instruction and switching a browser mode into a batch collection mode.

9. The system of claim 2, wherein the searching unit is further configured to display the at least one webpage tag in a browser.

10. The system of claim 2, further comprising:
  a prompting unit configured to prompt a user to select or create a favorites folder;
  the collecting unit being configured to save the webpage link address in the favorites folder selected or created by the user.

11. The system of claim 2, further comprising:
  a prompting unit configured to prompt a user to select or create a favorites folder when the judging unit judges that the matching degree between the tag name of the webpage tag and the name of the already created favorites folder does not reach the preset threshold value, so that the collecting unit saves the webpage link address in the favorites folder selected or created by the user.

12. The system of claim 2, further comprising:
  a mode switching unit configured to receive a browser batch collection mode switching instruction and switch a browser mode into a batch collection mode.

13. The method of claim 8, further comprising:
  receiving a browser browsing mode switching instruction and switching the browser mode into a browsing mode, so that when receiving an instruction of clicking on a webpage tag, the browser opens a webpage corresponding to the webpage tag in accordance with the instruction.

14. The system of claim 12, wherein the switching unit is further configured to receive a browser browsing mode switching instruction and switch the browser mode into a browsing mode, so that when receiving an instruction of clicking on a webpage tag, the browser opens a webpage corresponding to the webpage tag in accordance with the instruction.

* * * * *